No. 861,281.   PATENTED JULY 30, 1907.
A. S. HICKLEY.
ELECTROLYTIC ALTERNATING CURRENT RECTIFIER.
APPLICATION FILED FEB. 7, 1907.

Witnesses
F. L. Ourand.
W. Parker Reinohl.

Inventor
Arthur S. Hickley.
By D. L. Reinohl.
Attorney

UNITED STATES PATENT OFFICE.

ARTHUR S. HICKLEY, OF MANASQUAN, NEW JERSEY.

ELECTROLYTIC ALTERNATING-CURRENT RECTIFIER.

No. 861,281.     Specification of Letters Patent.     Patented July 30, 1907.

Application filed February 7, 1907. Serial No. 356,198.

*To all whom it may concern:*

Be it known that I, ARTHUR S. HICKLEY, a subject of the King of Great Britain, residing at Manasquan, in the county of Monmouth and State of New Jersey, have invented certain new and useful Improvements in Electrolytic Alternating-Current Rectifiers; and I do hereby declare the following to be a full, clear, and exact description of the invention, such as will enable others skilled in the art to which it appertains to make and use the same.

My invention relates to alternating-current rectifiers, electrolytic cells and electrolytic interrupters, has especial reference to that class of rectifiers known to the art as electrolytic alternating-current rectifiers, and the invention consists in certain improvements whereby the electrolyte or chemical solution, and the electrode are maintained at a low temperature by conducting the excessive heat therefrom and diffusing it in the atmosphere.

The invention will be fully disclosed in the following specification and claims.

In the practical operation of alternating-current rectifiers of the class described, it has been found that after working, that is passing electricity through an electrolytic cell, transformer or rectifier, one electrode which is aluminium and the other iron or carbon or other suitable material, that the electrolyte composed of phosphate of soda, carbonate of soda or other chemical solution, has its temperature raised to such a degree that its efficiency is greatly impaired. It is my purpose to remedy this defect by the means hereinafter described.

Figure 1:
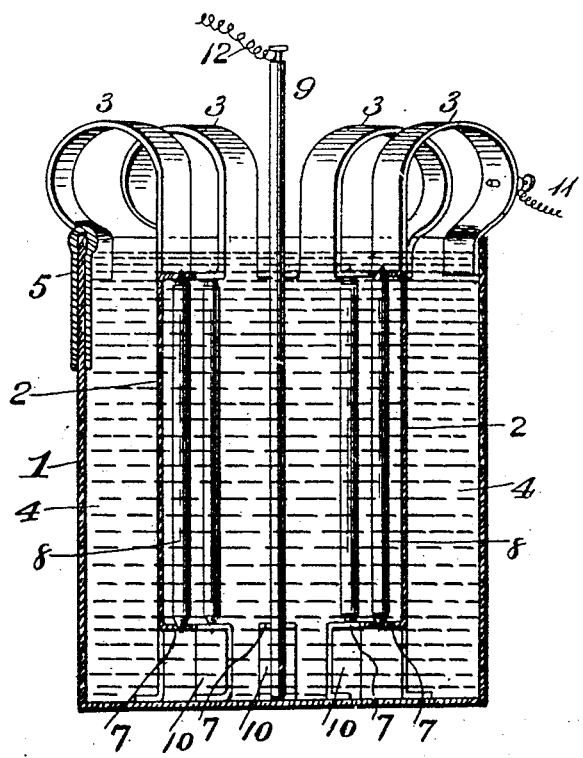
Figure 2:
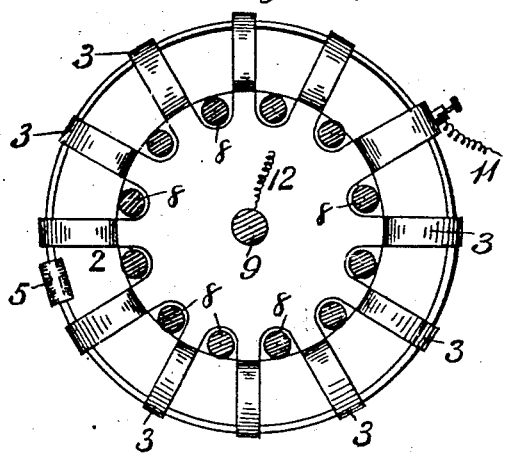

In the accompanying drawings, which form part of this specification:—Figure 1 represents a vertical section of an electrolytic cell embodying my invention, and Fig. 2 a top plan of the same.

Reference being had to the drawings and the designating characters thereon, the numeral 1 indicates a cell or receptacle for containing a suitable electrolyte. 2 is an electrode provided with loops 3 which extend beyond the body of the electrode, and are exposed to the atmosphere for the purpose of conducting heat from the electrolyte 4 and the body of the electrode and diffusing it in the atmosphere. It is obvious that these loops may be made separate from the body of the electrode and inserted in the electrolyte in the cell and allowed to hang over the upper end of the cell, as shown at 5, in Figs. 1 and 2. On the electrode are inwardly projecting lugs 7 in which rods 8 are supported which form supplementary electrodes for the purpose of increasing the surface of the electrode. 9 is a separate electrode, preferably made of aluminium.

The electrode 2 is provided with openings 10 at the lower end through which the electrolyte circulates, and with a wire 11 for connecting with one of the alternating current wires, and the electrode 9 is provided with a wire 12 which forms the positive pole for supplying direct current.

In the preferred form of construction, the electrode 2 is made of iron, and the supplemental electrodes 8 of carbon, and the separate electrode 9 preferably of aluminium; it is obvious however that the electrode 2, may be made of aluminium when the supplemental electrodes 8 are also aluminium; and the separate electrode 9 carbon, iron or other suitable material.

The electrolyte is a chemical solution composed preferably of phosphate of ammonium, or other well known solutions answering the same purpose.

Having thus fully described my invention, what I claim is

1. In an electrolytic cell, the combination with a receptacle for containing an electrolyte, of an electrode, and solid heat conducting members extending above and beyond the wall of the receptacle and of sufficient area to prevent undue heating of the electrolyte and the electrode.

2. In an electrolytic current rectifer, the combination with a receptacle for containing an electrolyte, of an electrode, and solid heat conducting members extending above and beyond the wall of the receptacle, and separate therefrom and of an area sufficient to prevent undue heating of the electrolyte and the electrode.

3. In an electrolytic current rectifier, the combination with a receptacle for containing an electrolyte, of an electrode, and a plurality of exposed solid radiating surfaces extending beyond the receptacle for conducting heat from the electrolyte and the electrode.

4. In an electrolytic alternating-current rectifier, the combination with a receptacle for containing an electrolyte, of a hollow electrode provided with radiating surfaces projecting from the body thereof and extending beyond the receptacle for conducting heat from the electrolyte and the electrode.

5. In an electrolytic alternating-current rectifier, the combination with a receptacle for containing an electrolyte, of a hollow electrode provided with a plurality of exposed radiating surfaces projecting from the body thereof and extending beyond the receptacle for conducting heat from the electrolyte and the electrode, and supplemental electrodes supported on said hollow electrode.

6. In an electrolytic cell, the combination with a receptacle for containing an electrolyte, of an electrode, means for conducting heat from the electrolyte and the electrode and diffusing the heat in the atmosphere, supplemental electrodes adjacent to and in electrical contact with said electrode, and an electrode separate from the foregoing electrodes.

In testimony whereof I affix my signature, in presence of two witnesses.

ARTHUR S. HICKLEY.

Witnesses:
    D. C. REINOHL,
    W. PARKER REINOHL.